United States Patent
McLaughlin et al.

(10) Patent No.: US 7,555,521 B1
(45) Date of Patent: Jun. 30, 2009

(54) SYSTEM AND METHOD FOR ACCEPTING TEXT CALLS ON VOICE TELEPHONES AT CALL CENTERS OR OTHER LOCATIONS

(75) Inventors: Thomas J. McLaughlin, Salt Lake City, UT (US); Jeff F. Knighton, Salt Lake City, UT (US); Alan S. Call, Salt Lake City, UT (US)

(73) Assignee: NXI Communications, Inc., Salt Lake City, UT (US)

( * ) Notice: Subject to any disclaimer, the term of this patent is extended or adjusted under 35 U.S.C. 154(b) by 688 days.

(21) Appl. No.: 10/410,724

(22) Filed: Apr. 10, 2003

Related U.S. Application Data

(60) Provisional application No. 60/373,452, filed on Apr. 11, 2002.

(51) Int. Cl.
*G06F 13/00* (2006.01)
(52) U.S. Cl. .................... 709/206; 709/229; 379/88.17; 704/271
(58) Field of Classification Search ................. 709/206, 709/229; 379/88.17; 704/271
See application file for complete search history.

(56) References Cited

U.S. PATENT DOCUMENTS

| | | | |
|---|---|---|---|
| 5,687,222 A | 11/1997 | McLaughlin et al. .......... 379/97 |
| 5,905,476 A | 5/1999 | McLaughlin et al. ............ 345/1 |
| 6,002,749 A | 12/1999 | Hansen et al. ................. 379/52 |
| 6,046,762 A * | 4/2000 | Sonesh et al. ............. 348/14.11 |
| 6,181,736 B1 | 1/2001 | McLaughlin et al. ......... 375/222 |
| 6,501,779 B1 | 12/2002 | McLaughlin et al. .......... 372/52 |
| 6,757,365 B1 * | 6/2004 | Bogard ..................... 379/88.17 |
| 6,782,081 B2 * | 8/2004 | Malik ....................... 379/93.24 |
| 2002/0026483 A1 * | 2/2002 | Isaacs et al. ................. 709/206 |
| 2003/0219104 A1 * | 11/2003 | Malik ....................... 379/88.11 |
| 2005/0254635 A1 * | 11/2005 | Koretsky et al. ........ 379/142.08 |

\* cited by examiner

*Primary Examiner*—Kenneth R Coulter
(74) *Attorney, Agent, or Firm*—John R. Thompson; Stoel Rives LLP

(57) ABSTRACT

The present invention informs a recipient of a holding non-voice call and allows the recipient to participate in real time text communication. A voice/text server is capable of communicating with a text device across a network or the Internet. The text device transmits the non-voice call to the voice/text server where the non-voice call is stored in a memory. The voice/text server generates a placeholder call and transmits the placeholder call to a voice telephone. The recipient receives the placeholder call by use of a voice telephone. A local text device generates a text link that is transmitted to the voice/text server. The voice/text server matches the text link to the holding text call. Text communication may then proceed between the users in any number of formats.

35 Claims, 5 Drawing Sheets

SYSTEM AND METHOD FOR ACCEPTING TEXT CALLS ON VOICE TELEPHONES AT CALL CENTERS OR OTHER LOCATIONS

RELATED APPLICATIONS

This application claims priority to U.S. Provisional Patent Application No. 60/373,452, filed Apr. 11, 2002 and entitled "A Technique for Accepting Text Calls on Voice Telephones at Call Centers or Other Locations."

BACKGROUND OF THE INVENTION

1. Field of the Invention

The invention relates to communication systems and more specifically to systems and methods for accommodating non-voice communications.

2. Relevant Technology

The plain old telephone system (POTS) or public switched telephone network (PSTN) has been in development since the late 1800's. In general, the term PSTN may mean any medium of communication in which at least part of the link is analog, and not digital, in nature. The PSTN was first developed to allow for person-to-person communications by voice over long distances. The PSTN was designed for calls between people who can both hear and speak, and was designed to handle voice sounds.

Deaf and speech impaired persons cannot readily use the PSTN to place or accept standard voice calls. In the 1960's TTY, or TDD, was designed and adopted by many deaf persons. The TDD is a type of modem and is a "text telephone" which can send typed text characters across the PSTN. TDDs encode text characters with a five-bit Baudot code, while most modems and desktop computers in the United States today use an ASCII encoding, also known as the ANSI X3.4-1977 or ASCII-77 encoding. TDDs transmit/receive at 45.45 bits per second and use frequency shift keying modulation/demodulation at frequencies of 1400 and 1800 Hz.

TDD callers are not able to communicate directly with voice telephones and will often use a relay service. The relay service provides an operator who receives the text call and provides a voice read of the text. Relay services are effective, but substantially slower than real time text communication.

Many people have access to desktop and laptop computers that are in communication with the internet and can easily support text communication. There are also new types of devices that support text communication such as alpha pagers, PDA's (personal digital assistants), wireless devices, and other internet capable devices. However, these devices are unable to communicate with a voice telephone.

Furthermore, many organizations today do not support TDD calls to most voice telephones in the organization. TDD calls are not recognized as voice calls. Thus, incoming TDD calls may not be received or cutoff prematurely.

It would, therefore, be an advancement in the art to provide a system and method for notifying a voice telephone of an incoming text call and providing text communication. Such a system and method are disclosed and claimed herein.

SUMMARY OF THE INVENTION

The present invention provides a unique system and method for informing a recipient of a holding text call. The recipient then decides if the user wishes to participate in the text call. If so, the recipient is able to engage in real time text communication. The system includes a voice/text server that is capable of communicating across a network or the Internet.

A user operates a text device to generate a non-voice call, such as a call with text characters. The text device transmits the non-voice call over the network or internet to the voice/text server. The voice/text server stores the non-voice call in a memory, or more specifically, a queue within the memory. The voice/text server then generates a placeholder call that corresponds to the non-voice call and transmits the placeholder call to a voice telephone.

A recipient receives the placeholder call that is compatible with the voice telephone. If the recipient wishes to engage in text communication, the recipient responds by operating a local text device. The local text device generates a text link that is transmitted over the network or internet to the voice/text server. The voice/text server matches the text link to the holding non-voice call. Text communication may then proceed between the users in any number of formats.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAIL DESCRIPTION OF PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figure herein, could be arranged and designed in a wide variety of different configurations. Thus, the following more detailed description of the embodiments of the apparatus, system, and method of the present invention, as represented in FIGS. 1 to 4, is not intended to limit the scope of the invention, as claimed, but is merely representative of presently preferred embodiments of the invention.

Figure 1:
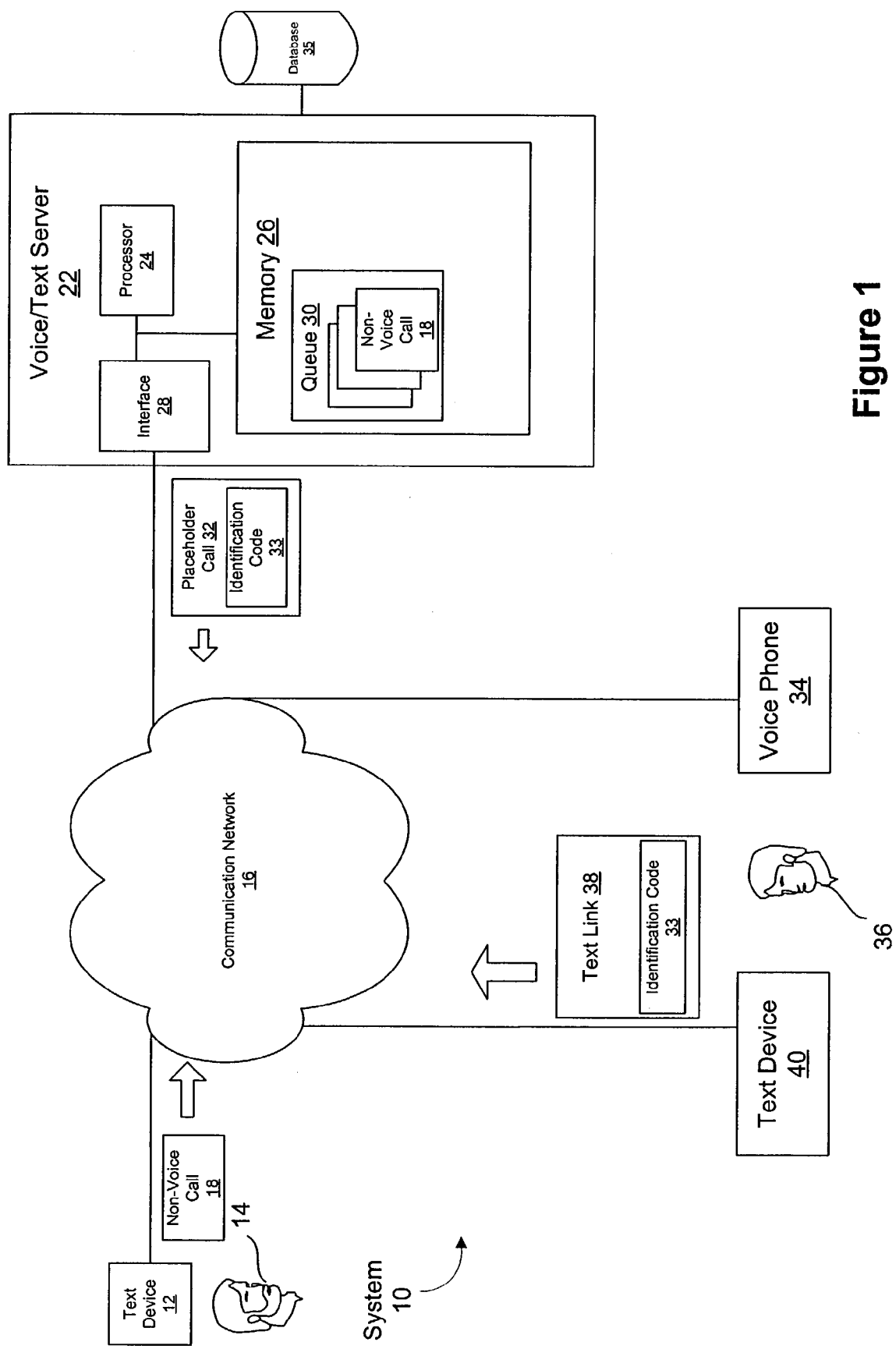
FIG. 1 is a block diagram illustrating a system of the present invention.

Referring to FIG. 1, a schematic block diagram of a system 10 for use with the present invention is shown. A text device 12 generates a call that may be characterized as non-audio or a non-voice call that is interpreted visually by another user. The non-voice call may include alphanumeric text, graphics, and other forms of signals that are legible.

The text device 12 may be a conventional TDD or TTY device or other such device that uses the text telephone standards. These standards include the TTY 45/50 bps Baudot in use in U.S., Canada, and Australia and the EDT (European Deaf Telephones) used in other countries. The text device 12 may also be a personal computer suitable for providing email, webchat, and other forms of communication. The text device 12 may also be a set top box, alpha pager, personal digital assistant (PDA), cellular telephone, or other device capable of generating text characters and interfacing with a communication network 16.

A user 14 of the text device 12 may wish to converse with a recipient who has a voice telephone, and it may not be possible for the user 14 to call the voice telephone user directly. This is the case if the user 14 is hearing or vocally impaired or if the user 14 does not have convenient access to a voice telephone.

The communication network 16 may be implemented in various ways including a PSTN or a wide area network (WAN) such as the Internet. There are various ways for a text device 12 to couple and communicate through different embodiments of a communication network 16 and such methods are well known in the art. Upon coupling to the communication network 16, the text device 12 transmits a non-voice call 18.

Rather than transmitting the non-voice call 18 directly to a recipient, the non-voice call 18 is routed or transferred through the network 16 to a voice/text server 22. In one embodiment, the network 16 may be a PSTN and the text device 12 may be a TTY compatible device. In this case, routing the non-voice call 18 to the voice/text server 22 may be achieved in different ways. The user 14 may be calling a voice telephone at an organization which has a published TTY phone number. The user 14 can dial the published TTY phone number and be directed to the voice/text server 22 on a phone line or trunk.

In one implementation, the voice/text server 22 extracts the phone number dialed (DNIS or DID) from the non-voice call 18. If DNIS/DID is available, then the voice/text server 22 can serve any number of separate destinations. The voice/text server 22 maintains a list or a database of participants corresponding to the DNIS/DID numbers. The DNIS/DID of a particular call will identify which participant is being called in this manner. The voice/text server 22 may provide an initial text greeting to the user 14 that identifies the participant being called based on the DNIS/DID of the non-voice call 18.

The voice/text server 22 may further extract the phone number of the calling party (caller ED or ANI). This is common practice where the phone trunk is a digital trunk such as a T1 or PRI ISDN line. The calling party number may be sent to an intended recipient as explained below.

Alternatively, the user 14 could call directly to an organization or entity. The person answering the non-voice call 18 could transfer the call 22 to the voice/text server 22. Other means of routing or transferring a PSTN non-voice call 18 to the voice/text server 22 are known in the art and are included within the scope of the invention.

The voice/text server 22 includes a processor 24 for performing methods of the present invention. The processor 24 is in communication with a memory 26 and a communication interface 28 for coupling with the network 16. The voice/text server 22, on answering the non-voice call 18, may send some form of text greeting and a "please hold" message. The voice/text server 22 may place the non-voice call 18 in a queue 30 that is resident in the memory 26.

The voice/text server 22 may assign an identification code 33 or queue name to identify the received non-voice call 18. The identification code 33 allows specific identification of each received non-voice call 18 and is used to match the inbound non-voice call 18 with a recipient at a voice telephone as described below.

The voice/text server 22 generates a placeholder call 32 which is so named because the placeholder call 32 notifies a recipient of a held non-voice call 18. The placeholder call 32 may include an identification code 33 which corresponds to the pending non-voice call 18 held in the queue 30. The placeholder call 32 may further include the ANI of the pending non-voice call to notify a recipient of the calling party number which is also referred to as the origination number. The placeholder call 32 is transmitted through the network 16 to a voice telephone or voice telephone system recipient 34.

The voice/text server 22 transmits the outgoing placeholder call 32 to a designated voice number of a participating entity. The voice/text server 522 can ascertain the voice number in different ways. In one example, the voice/text server 22 is used in a service bureau or other organization where multiple TTY numbers are supported on T1 or PRI trunks. If a TTY user dials one of these numbers directly, then the voice/text server 22 can access a database 35. The database 35 contains voice numbers of various organizations that are mapped to the TTY numbers. The voice/text server 22 then searches and retrieves the voice number from the database 35 based on the DNIS/DID of the number dialed.

In some cases, the non-voice call 18 may arrive at a voice phone at an organization before arriving at the text/server 22. A recipient answering the non-voice call 18 may transfer the call 18 to the voice/text server 22. In this case, the voice/text server 22 retrieves either the DNIS/DID, or the ANI, of the transferred non-voice call 18 and accesses the database 35. The voice/text server 22 maps the call to a voice telephone 34. The ANI, in this case, will show the organization receiving the initial non-voice call 18.

A user 36, also referred to herein as a recipient, receives the placeholder call 32 through the voice telephone 34. The recipient may be an individual capable of hearing. The placeholder call 32 may contain voice notification that a non-voice call 18 is pending in the queue 30. The placeholder call 32 may also contain an audio message of the identification code 33 corresponding to the non-voice call 18. Alternatively, the identification code 33 may be resident in the placeholder call 32 but is not as an audio message for the recipient 36.

The placeholder call 32 may further include the ANI of the calling party number to indicate the origination. Identifying the origination of a calling party is useful in a number of commercial applications.

The recipient 36 may respond to the placeholder call 32 by generating a text link 38 by use of a remote text device 40. By responding to the placeholder call 32 with a text call, such as the text link 38, the voice/text server 22 is able to match the text link 38 with the holding non-voice call 18. After matching, a text conversation may then proceed. Thus, the system 10 relies upon a recipient 36 responding to the placeholder call 32 by sending a form of a text call to the voice/text server 22.

The text device 40 may be similarly embodied as the text device 12. In one embodiment, the text device 40 may be a modem or a TDD/TYY compatible device. Alternatively, the text device 40 may be a personal computer with instruction code and suitable interface for text or graphic communication over the network 16. The text device may also be an alpha pager, set top box, PDA, cellular phone, and so forth. One of skill in the art will appreciate that the text device 40 may have various embodiments and these are included within the scope of the invention.

The text link 38 may include the received identification code 33. Identification codes 33 may be based on the DNIS or ANI of the non-voice call 18. The identification code 33 allows matching of the text link 38 with a non-voice call 18 in the queue 30. The voice/text server 22 may also use a time-based system for matching non-voice calls 18. For example, the voice/text server 22 may match the non-voice call 18 held the longest with an inbound text link 38. In this way, each non-voice call 18 does not need a separate identification code 33.

The recipient 36 may include the identification code 33 with the text link 38 by manually entering the code 33 into the text device 40. In an alternative embodiment, the voice telephone 34 and the text device 40 may be integrated together. As such, a recipient 36 may respond by entering a command that acknowledges acceptance of the non-voice call 18. The voice telephone 34/text device 40 then generates and transmits the text link 38 to the voice/text server 22. The recipient 36 may not be notified of the identification code 33 and the identification code 33 may be automatically inserted into the text link 38. As used herein, automatically signifies without human intervention. Of course, the system 10 may still notify the recipient 536 of the identification code 33 and have the user 36 manually enter the code 33.

The voice/text server 22 receives the text link 38 and retrieves the non-voice call 18 held in the queue 30. The voice/text server 22 then enables text communication between the user 14 and the recipient 36 through their respective text devices 12, 40. The users 14, 36 may exchange packets of text data for real time, typed conversation. Text communication may be turn-based, wherein each user completes and sends text data before the other user responds. Alternatively, text communication may be simultaneous wherein received text is displayed while a user enters comments.

The recipient 36 may hang up the placeholder call 32 once the text link 38 has been sent and received. However, as explained below, leaving the placeholder call 32 in place for the duration of the text communication has advantages where the recipient 36 is a call agent in a call center. In either situation, at the conclusion of the text communication, the user 14 and the recipient 36 will hang up any in-place calls.

Figure 2:
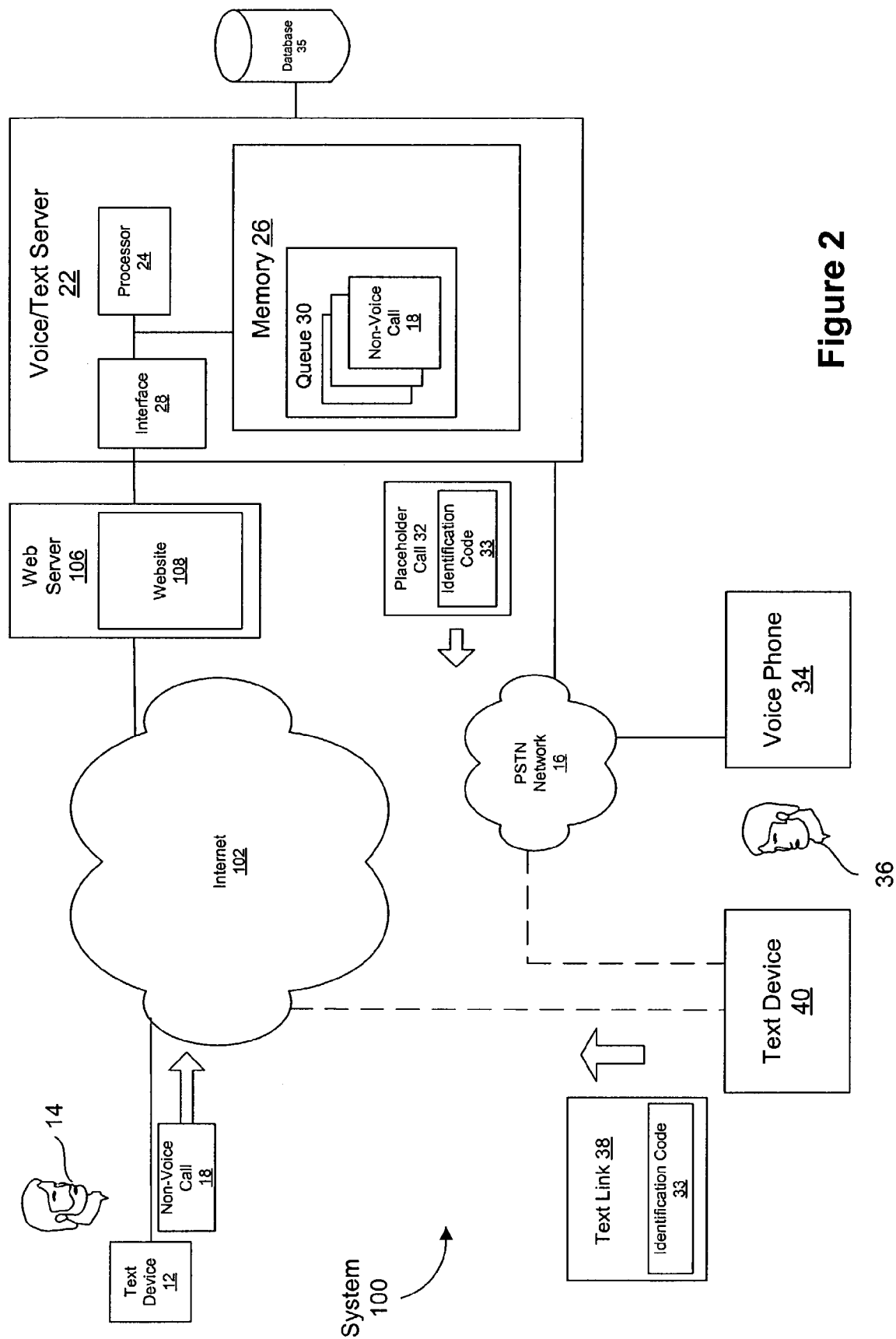
FIG. 2 is a block diagram illustrating an alternative embodiment of a system of the present invention.

Referring to FIG. 2, an alternative embodiment of a system 100 is shown for use with the present invention. The system 100 is used with the Internet 102, and the text device 12 is capable of Internet communication. The text device 12 may be a personal computer with a browser, PDA, wireless device, alpha pager, or other Internet-enabled device. Thus, a user 14 may use an internet-enabled device to call into a voice telephone or a voice-only call center.

The system 100 may include a webserver 106 that hosts a website 108. The text device 12 communicates with the webserver 106 and receives a website 108 operated by an organization or individual. The user 14 is able to review a displayed webpage from a website 108. The webpage can include text such as "click here to call the ABC call center" or similar language. A user 14 may select a link, icon, highlighted text, or other graphic displayed on the website 108 to initiate a non-voice call 18.

The website 108 may include information on the intended recipient such as the voice telephone number. When the user 14 selects a link displayed on the website 108, a connection is made between a browser and the webserver 106. This can be enabled by using a Java applet or similar control. The information as to the "ABC call center" organization, or its phone number, is then transmitted to the voice/text server 22.

The webserver 106 relays the non-voice call 18 and routing information, such as the organization name or voice telephone number to be called, to the voice/text server 22. The webserver 106 may communicate with the voice/text server 22 across a network 16, Internet 102, or other systems known in the art. In the embodiment shown, the voice/text server 22 communicates with the webserver 108 through an interface 28. Alternatively, the webserver 106 and the voice/text server 22 may be integrated together. In one embodiment, the webserver 106 may be integrated with the voice/text server 22.

The voice/text server 22 receives the non-voice call 18 and routing information and places the non-voice call 18 in the queue 30. The voice/text server 22 then generates a placeholder call 32 and sends the call 32 to a voice telephone 34 over a network 16, such as a PSTN. The destination number of the voice telephone 34 may be derived from the routing information. In one embodiment, a link selected on a website 108 corresponds to a destination number. The voice/text server 22 may also access a database 35 to retrieve a destination number that is mapped to the selected link.

As in the previous embodiment, the placeholder call 32 may include an identification code 33 and audio instructions for the recipient 36. The recipient 36 may respond to the placeholder call 32 by generating a text link 38 through the text device 40. In one embodiment, the text device 40 may be a TDD or TYY compatible device that communicates over the PSTN network 16 to the voice/text server 22.

The text device 40 may be Internet-enabled and communicates over the Internet 102 with the webserver 106. In many organizations and homes a voice telephone 34 is disposed near an Internet-linked computer. The computer may be used to generate the text link 38 to the voice/text server 22. The computer may have a browser for internet-enabled text communication. Alternatively, an Internet chat program on the computer could be used. The text device 40 may also be embodied as any number of text capable devices such as an alpha pager, PDA, or other internet-enabled device. The identification code 33 may be included in the text link 38.

The webserver 106 interacts with the voice/text server 22 to retrieve the non-voice call 18 held in the queue 30. The webserver 106 and voice/text server 22 further interact to establish text communication between the users 14, 36 in a manner similar to that previously described.

In either embodiment, the recipient 36 may include the identification code 33 with the text link 38 by manually entering the code 33 into the text device 40. The code 33 is used to link the text link 38 with the non-voice call 18 held in the queue 30. Alternatively, the voice telephone 34 and the text device 40 may be integrated, and a recipient 36 may respond by entering an acceptance command. The voice telephone 34/text device 40 may then generate and transmit the text link 38 to the voice/text server 22 or to the webserver 106.

The placeholder call 32 may include audio instructions that instruct the recipient 36 on how to establish a text link 38. For example, the placeholder call 32 could say "text call, please go to your company's text website, www.nexttalk.net, and enter the following identification code '123'" or similar instructions. The voice/text server 22 could use the identification code "123" to match the text link 38 with the holding non-voice call 18.

The queue 30 could be mapped to the website 108 for this organization. Where the text device 40 is an internet-enabled device, such as a personal computer with a browser, the recipient 36 accesses the website 108 and enters the identification code 33. The text link 38 is generated by an entry on the website 108. The webserver 106 transmits the entry to the voice/text server 22 and the voice/text server 22 matches the text link 38 with the non-voice call 18. In one implementation, the text link 38 is matched with the non-voice call 18 held in the queue 30 the longest thereby removing the need for an identification code 33.

The voice telephone 34 may be in communication or integrated with the text device 40. As such, the text device 40 may retrieve the ANI of the PSTN/placeholder call 32. The text device 40 may recognize from the ANI that the incoming caller is the voice/text server 22. The text device 40 may then automatically launch a browser, as described above, to make a text call back to the voice/text server 22. Automated steps may include all aspects of establishing a text communication, however, it is desirable to provide user intervention to determine if the non-voice call 18 is accepted. The recipient 36 answering the placeholder call 32 could also use an Internet chat application to create a text link 38 back to the voice/text server 22.

In either the embodiments of FIG. 1 or 2, the recipient 36 may hang up the placeholder call 32 once the text link 38 has been received and text communication has been established. However, there are situations where leaving the placeholder call 32 in place for the duration of the text call is advantageous. One example is where the recipient 36 is a call agent in a call center which is discussed below.

Figure 3:
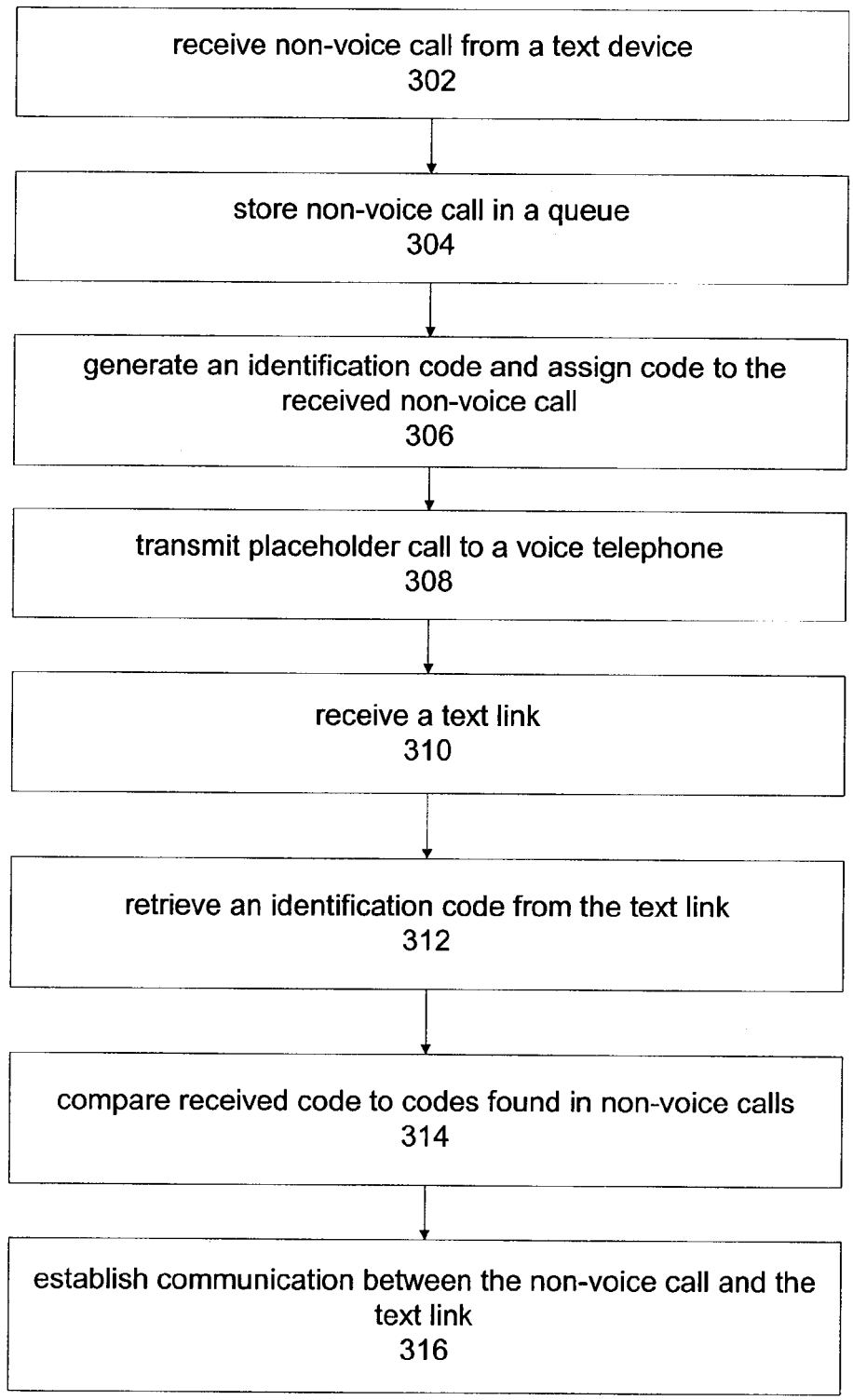
FIG. 3 is a flow diagram illustrating a method of the invention performed by a voice/text server.

Referring to FIG. 3, a flow diagram is shown illustrating a method 300 performed by the voice/text server 22. Instruction code resident on the memory 26 and executed by the processor 24 performs the method 300 described herein. The method 300 is generally applicable to both the embodiments of FIGS. 1 and 2. Additional steps may be implemented, and the method shown is for illustrative purposes only.

The voice/text server 22 receives 302 the non-voice call 18 from the text device 12. The non-voice call 18 may be received from a PSTN network 16, from the Internet 102, or from another type of network. The non-voice call 18 may be directly sent through a phone number specific to the voice/text server 22 or routed by the recipient 36. The non-voice call 18 may be generated and received through a website, generated by email, or generated by any number of Internet-enabled devices.

The non-voice call 18 is next stored 304 in a queue 30 that is resident in the memory 26. Entry of the non-voice call 18 may be sequential. The voice/text server 22 generates 306 an identification code 33 and assigns the code 33 to the received non-voice call 18. The code 33 may be based on the ANI or DNIS of the non-voice call 18. Alternatively, the code 33 may be time-based, randomly generated, or generated in some alternative manner.

The voice/text server 22 then transmits 308 a placeholder call 32 to the voice telephone 34 designated by the non-voice call 18. The placeholder call 32 includes the identification code 33. The voice/text server 22 then receives 310 a text link 38 through the PSTN network 16, Internet 102, or other type of network. The voice/text server 22 retrieves 312 an identification code 33 from the text link 38. The voice/text server 22 then compares 314 the received code 33 to codes found in non-voice calls 18 stored in the queue 30. Upon a successful match, the voice/text server 22 then establishes 316 communication between the non-voice call 18 and the text link 38. Text communication continues until disconnect by the parties.

Figure 4:
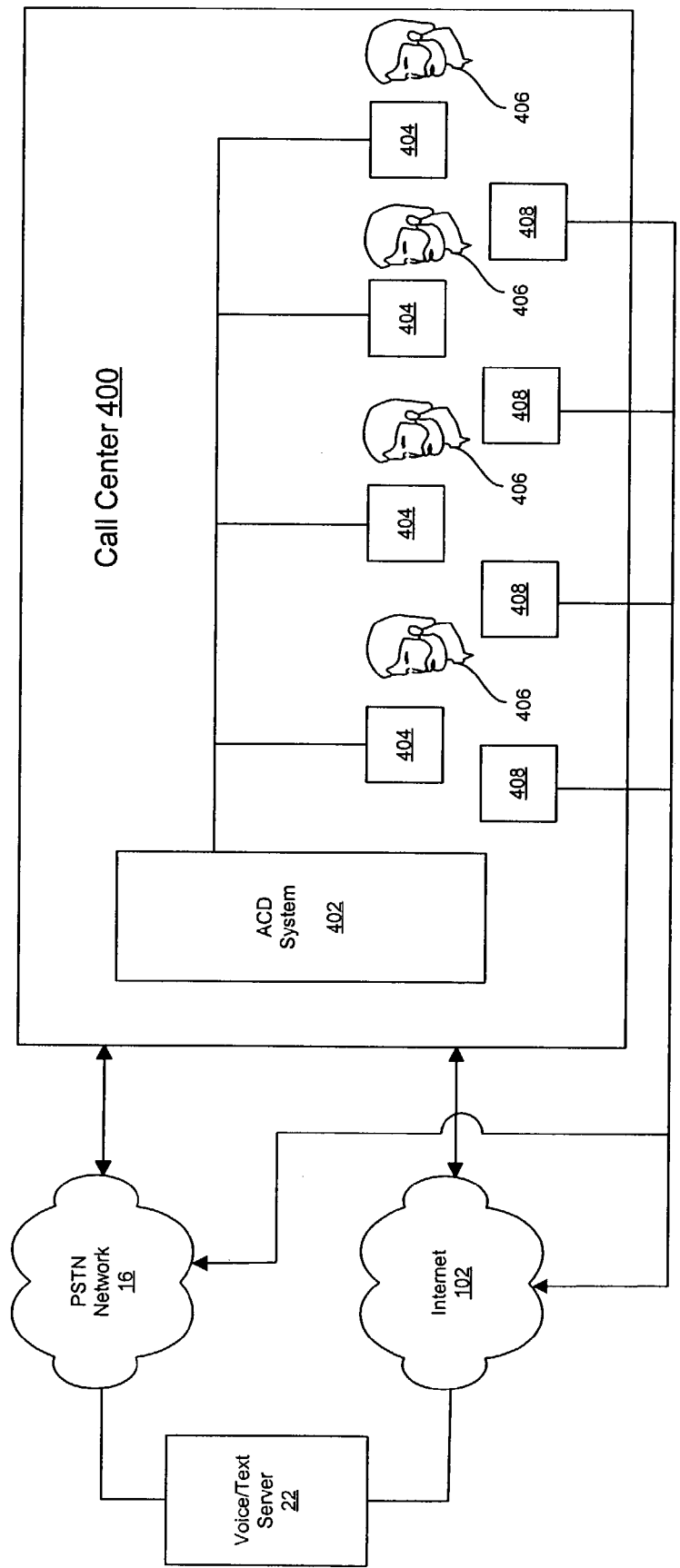
FIG. 4 is a block diagram illustrating a call center for use with the present invention.

Referring to FIG. 4, a block diagram illustrating a call center 400 that is in communication with a PSTN network 16 and the Internet 102 is shown. The call center 400 includes an automated call distribution (ACD) system 402 that couples with voice telephones 404 that are operated by call agents 406. The ACD system 402 routes voice calls to the different voice telephones 404 as the telephones become available. The ACD system 402 may be embodied as a computer operating a computer telephony integration (CTI) which is an application that enables the computer to operate as a call center. The ACD system 402 is typically designed for voice calls and not text calls. The ACD system 402 may maintain call statistics and track the time that each call agent 406 spends on calls versus idle time.

If a non-voice call is sent to a call agent 406, it is desirable to create some type of integration with the ACD system 402. If the ACD system 402 is not aware that a call agent 406 is busy on a non-voice call, then the ACD system 402 may send a voice call to this same call agent 406. Similarly, the call agent's time spent on non-voice calls may not be tracked by the ACD system 402 without integration. However, creating communication links and integrating with the ACD system 402 to handle non-voice calls is often expensive and difficult.

The invention offers a much simpler approach than an ACD integration approach. When the voice/text server 22 described above sends a placeholder call 32 to the call center 400, the placeholder call 32 sits in a queue of the ACD system 402 for some period. During the hold period, the voice/text server 22 may send "please hold" messages back to the text device 12.

Once the placeholder call 32 is routed by the ACD system 402 to a call agent 406, then the agent 406 creates a text link 38 back to the voice/text server 22 to link to the holding non-voice call 18. A text device 408 is placed adjacent the call agents 406 to enable text communication. The text devices 408 may be similarly embodied as the devices 12, 40 previously described. Thus, a text device 408 may be internet-enabled or capable of communication across a PSTN network.

After receiving a placeholder call 32, the call agent 406 retains connection with the placeholder call 32. For the ACD system 402, the placeholder call 32 is treated as the actual call so it knows that this call agent 406 is busy. The ACD system 402 will not send a new voice call to this agent 406. Once the text communication is completed, the call agent 406 hangs up the text link 38 and the placeholder call 32. The ACD system 402 then tracks the amount of time this call agent spent on the non-voice call based on the time of the placeholder call 32. The ACD system 402 is then free to send new incoming voice calls to this call agent 406.

The methods of the present invention may be extended to text messages. This is particularly useful for call centers 400 that wish to track their call agents' time spent answering email, instant messages, or other text messages. The voice/text server 22 receives an email, instant message, or other text message generated by a text device 12 and directed to the call center 400. The voice/text server 22 transmits a placeholder call 32 to the call center 400 as described above.

If the text message contains the user's phone number, the voice/text server 22 may place the user's phone number as the ANI of the placeholder call 32. The placeholder call 32 may wait in the queue of the ACD system 402 but will eventually reach a call agent 406. The call agent 406 generates a text link 38 back to the voice/text server 22 through use of a text device 408 as described above.

The text link 38 is matched to the text message that is waiting in a queue 30 of the voice/text server 22. The voice/text server 22 then transmits the text message to the text device 408 instead of a "live" non-voice call as previously described. The call agent 406 can retain connection with the placeholder call 32 while the agent responds to the text message. Once a response is complete, the call agent 406 can hang up the placeholder call 32. The ACD system 402 considers the call agent 406 to be busy while the agent 406 responds to the text message. The ACD system 402 considers the call agent 406 to be available again when the placeholder call 32 is disconnected.

In an alternative implementation, the voice/text server 22 may dial a phone number into the call center 400 for "text message" type calls. These text messages may be directed to through the ACD system 402 and to the text devices 408. The call agent's time spent on these text messages can be tracked by ACD system 402. The standard ACD call reports tracks the number dialed for incoming calls including non-voice calls.

In one implementation, the ACD system 402 receives an incoming placeholder call 32 and retrieves and records the identification code 33. The identification code 33 may be the ANI of the text device 12. The system 402 sends the placeholder call 32 to a voice telephone 404. The system 402 further accesses a memory or database, which may be resident within the system 402, to locate a text device 408 assigned to the voice telephone 404 receiving the placeholder call 32. The assigned text device 408 would be proximate to the voice telephone 404 to allow use by a call agent 406.

The system 402 generates a text link 38 and includes the identification code 33. The text link 38 is sent to the voice/text server 22 where the text link 38 is matched to the non-voice call 18 as previously discussed. The system 402 may be coupled with the text devices 408 to enable communication. Once the text-based communication is enabled, the system 402 contacts the assigned text device 408. The assigned text device 408 then participates in the text-based communication.

In another method, the system 402 does not generate a text link 33, but is coupled to the text devices 408. Upon transmitting a placeholder call 32 to a voice telephone 404, the system 402 contacts the corresponding text device 408. The system 402 then transmits the identification code 33 to the text device 408. The text device 408 may automatically, that is without user intervention, generate a text link 38 with the identification code 33 included. The text link 38 is transmitted to the voice/text server 22 where text-based communication is established between text devices 12, 408.

The foregoing methods require little or no user intervention by a call agent 406. A call agent 404 is notified of the non-voice call 18 by the placeholder call 32. The agent 406 may then turn to a corresponding text device 408. Text-based communication may be enabled with the text device 408 without the call agent 406 entering an identification code 33. The call agent 406 may then participate in a text conversation. As before, the call agent 406 may retain connection with the placeholder call 32 for determining the call length.

Alternatively, the system 402 may monitor the length of the text conversation through communication with the text device 408. In such an implementation, the agent 406 would not need to retain the connection with the placeholder call 32.

In some situations, a user 14 may be able to vocalize speech, but be unable to hear. It would be advantageous to provide audio to a recipient 36 or call agent 406 and enable text responses.

Figure 5:
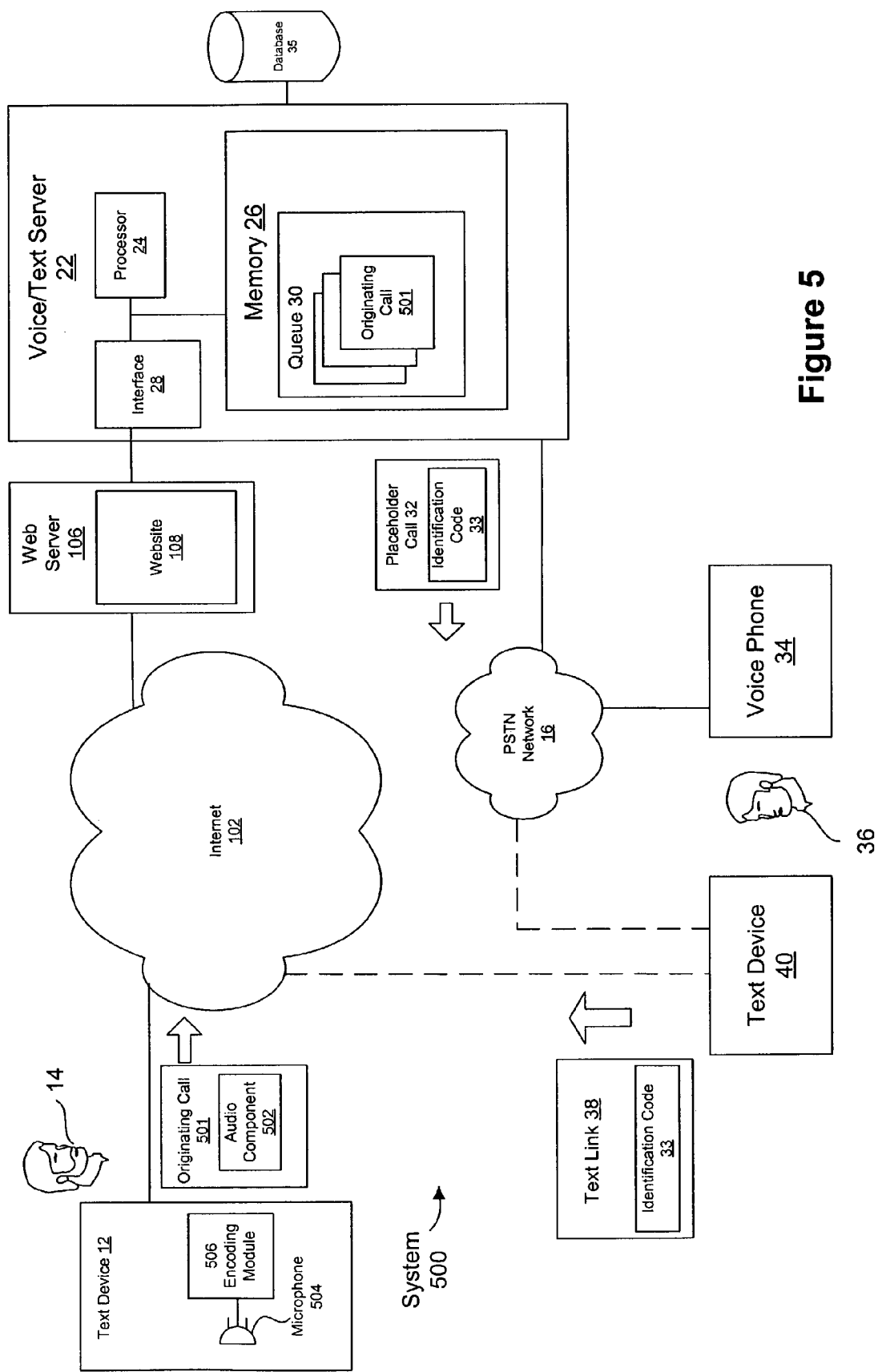
FIG. 5 is a block diagram illustrating an alternative embodiment of a system of the present invention.

Referring to FIG. 5, an alternative system 500 is shown wherein an originating call 501 includes a text message as well as an audio component 502 that conveys voice messages from the user 14. The text device 12 may be configured with a microphone 504 that receives voice audio from the user 14. The microphone 504 is in electrical communication with an encoding module 506 that receives the audio and inserts the audio component 502 within the originating call 501. As such, the encoding module 506 may include components well known in the art such as an analog-to-digital converter, filter, and a mixer.

The voice/text server 22 receives the originating call 501 containing the audio component 502. The voice/text server 22 identifies the originating call 501 and holds the originating call 501 in the queue 30. The voice/text server 22 further generates a placeholder call 32 that includes the audio component 502 of the originating call 501. Thus, the audio component 502 passes through the voice/text server 22 to a recipient 36. The placeholder call 32 may further contain an identification code 33 and an ANI of the originating call 501 as in previous embodiments.

The identification code 33 may be an audio message that is relayed to the recipient 36. Alternatively, the identification code 33 may be alphanumeric characters that are displayed to the recipient 36. The audio component 502 is also relayed to the recipient 36 through the voice phone 34 to allow the user 14 to speak to the recipient 36. The recipient 36 responds by operating the text device 40 to generate a text link 38 including the identification code 33. Matching of the text link 38 to the originating call 501 continues as in previous embodiments.

Once the text link 38 is matched to the originating call 501, the user 14 receives text messages from the recipient 36. The user 14 may respond vocally through the microphone 504. The text device 12 may pass audio components 502 to the voice/text server 22 which are then transmitted to the voice phone 34. Audio need not necessarily be combined with an originating call 501. A combination of voice and text communication is thereby enabled. A hearing user 36 may receive voice and transmit text messages while the hearing impaired user 14 receives text messages and transmits voice. One of skill in the art will appreciate that the system 10 of FIG. 1 may also accommodate the variations shown in FIG. 5.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated in the appended claims rather than by the foregoing description. All changes within the meaning and range of the claims are to be embraced within their scope.

What is claimed is:

1. A voice/text server for providing text-based communication between an originating user and a recipient, the voice/text server comprising:

a network interface for communicating with a network;

a processor coupled to the network interface; and a memory coupled to the processor, the memory including computer executable instruction code for performing a method comprising, receiving an originating live non-voice call from the network, holding the live non-voice call, generating a placeholder call corresponding to the live non-voice call, wherein the placeholder call is a voice call, transmitting the placeholder call through the network to a voice telephone to notify the recipient of the live non-voice call, receiving from the network a text link generated by the recipient using a text device, and matching the text link to the live non-voice call to establish communication between the text device and the live non-voice call.

2. The voice/text server of claim 1, wherein the method further comprises storing the live non-voice call in a queue in the memory.

3. The voice/text server of claim 1, wherein the method further comprises:

generating an identification code specific to the live non-voice call; and inserting the identification code in the placeholder call.

4. The voice/text server of claim 3, wherein the identification code includes an audio signal.

5. The voice/text server of claim 3, wherein the text link includes the identification code and wherein matching the text link to the live non-voice call includes comparing the identification code of the live non-voice call to the identification code of the text link.

6. The voice/text server of claim 1, wherein transmitting the placeholder call includes, extracting a dialed number from the live non-voice call; and deriving from the dialed number a destination number for the placeholder call.

7. The voice/text server of claim 6, wherein deriving the destination number for the placeholder call includes accessing a database to retrieve a voice telephone destination number that corresponds and is mapped to the dialed number.

8. The voice/text server of claim 1, wherein the method further includes, retrieving an origination number of the originating user from the live non-voice call; and inserting the origination number in the placeholder call.

9. The voice/text server of claim 1, wherein the method further comprises generating a text greeting for the originating user.

10. The voice/text server of claim 1, wherein receiving an originating live non-voice call comprises receiving text or graphic communication over a network from a personal computer.

11. The voice/text server of claim 10, wherein graphic communication comprises video.

12. The voice/text server of claim 1, wherein receiving an originating live non-voice call comprises receiving a video call.

13. The voice/text server of claim 1, wherein the originating live non-voice call is received from a set top box.

14. The voice/text server of claim 1, wherein the originating live non-voice call is received from an alpha pager.

15. The voice/text server of claim 1, wherein the originating live non-voice call is received from a personal digital assistant (PDA).

16. A voice/text server for providing text-based communication between an originating user and a recipient, the voice/text server comprising:

an interface for communicating with a webserver;

a processor coupled to the interface; and a memory coupled to the processor, the memory including computer executable instruction code for performing a method comprising, receiving an originating live non-voice call from the webserver, holding the live non-voice call, generating a placeholder call corresponding to the live non-voice call, wherein the placeholder call is a voice call, transmitting the placeholder call through a telephone network to a voice telephone to notify the recipient of the live non-voice call, receiving from the webserver a text link generated by the recipient using a text device, and matching the text link to the live non-voice call to establish communication between the text device and the live non-voice call.

17. The voice/text server of claim 16, wherein the method further comprises storing the non-voice call in a queue in the memory.

18. The voice/text server of claim 16, wherein the method further comprises:

generating an identification code specific to the live non-voice call; and inserting the identification code in the placeholder call.

19. The voice/text server of claim 18, wherein the text link includes the identification code and matching the text link to the live non-voice call includes comparing the identification code of the live non-voice call to the identification code of the text link.

20. The voice/text server of claim 16, wherein transmitting the placeholder call includes, receiving routing information from the webserver; and deriving from the routing information a destination number for the placeholder call.

21. The voice/text server of claim 20, wherein deriving the destination number includes accessing a database to retrieve the destination number mapped to the routing information.

22. A voice/text server for providing text-based communication between an originating user and a recipient, the voice/text server comprising:

a webserver for hosting a website and enabled for internet communication;

a processor in communication with the webserver; and a memory coupled to the processor, the memory including computer executable instruction code for performing a method comprising, receiving an originating live non-voice call from the webserver, holding the live non-voice call, generating a placeholder call corresponding to the live non-voice call, wherein the placeholder call is a voice call, transmitting the placeholder call through a telephone network to a voice telephone to notify the recipient of the live non-voice call, receiving from the webserver a text link generated by the recipient using a text device, and matching the text link to the live non-voice call to establish communication between the text device and the live non-voice call.

23. The voice/text server of claim 22, wherein the method further comprises storing the live non-voice call in a queue in the memory.

24. The voice/text server of claim 22, wherein the method further comprises:

generating an identification code specific to the live non-voice call; and inserting the identification code in the placeholder call.

25. The voice/text server of claim 24, wherein the text link includes the identification code and matching the text link to the live non-voice call includes comparing the identification code of the live non-voice call to the identification code of the text link.

26. The voice/text server of claim 22, wherein transmitting the placeholder call includes, receiving routing information from the webserver; and deriving from the routing information a destination number for the placeholder call.

27. The voice/text server of claim 26, wherein deriving the destination number includes accessing a database to retrieve the destination number mapped to the routing information.

28. A voice/text server for providing text-based communication between an originating user and a recipient, the voice/text server comprising:
- an interface for communicating with a webserver;
- a processor coupled to the interface; and
- a memory coupled to the processor, the memory including computer executable instruction code for performing a method comprising,
  - receiving an originating live call from the webserver, the originating live call including a non-voice component and an audio component,
  - holding the originating live call,
  - separating the audio component from the originating call,
  - generating a placeholder call corresponding to the originating live call wherein the placeholder call is a voice call,
  - inserting the audio component within the placeholder call,
  - transmitting the placeholder call through a telephone network to a voice telephone to notify the recipient of the live non-voice call,
  - receiving from the webserver a text link generated by the recipient using a text device, and
  - matching the text link to the originating live call to establish communication between the text device and the live non-voice call.

29. The voice/text server of claim 28, wherein the method further comprises storing the originating live call in a queue in the memory.

30. The voice/text server of claim 28, wherein the method further comprises:
- generating an identification code specific to the originating live call; and
- inserting the identification code in the placeholder call.

31. The voice/text server of claim 30, wherein the text link includes the identification code and matching the text link to the originating live call includes comparing the identification code of the originating call to the identification code of the text link.

32. The voice/text server of claim 28, wherein transmitting the placeholder call includes,
- receiving routing information from the webserver; and
- deriving from the routing information a destination number for the placeholder call.

33. The voice/text server of claim 32, wherein deriving the destination number includes accessing a database to retrieve the destination number mapped to the routing information.

34. A method for providing text-based communication between an originating user and a recipient located within a call center, the method comprising:
- a voice/text server receiving an originating live non-voice call;
- the voice/text server holding the live non-voice call;
- the voice/text server generating a placeholder call corresponding to the live non-voice call, wherein the placeholder call is a voice call;
- the voice/text server transmitting the placeholder call through the network to the call center;
- the call center transmitting the placeholder call to a voice telephone to notify a recipient of the live non-voice call;
- the recipient generating a text link while retaining connection with the placeholder call;
- the voice/text server receiving the text link; and
- the voice/text server matching the text link to the live non-voice call to establish communication.

35. A method for providing text-based communication between an originating user and a recipient located within a call center, the method comprising:
- a voice/text server receiving an originating live non-voice call;
- the voice/text server holding the live non-voice call;
- the voice/text server generating a placeholder call corresponding to the live non-voice call, wherein the placeholder call is a voice call;
- the voice/text server transmitting the placeholder call through the network to the call center;
- the call center transmitting the placeholder call to a voice phone;
- the call center generating a text link and transmitting the text link to the voice/text server;
- the voice/text server receiving the text link;
- the voice/text server matching the text link to the live non-voice call to establish communication; and
- the call center engaging a text device corresponding to the voice phone to receive communication.

* * * * *